United States Patent
Gregorski et al.

(10) Patent No.: US 8,973,409 B2
(45) Date of Patent: Mar. 10, 2015

(54) METHODS AND APPARATUSES FOR COOLING OPTICAL FIBERS

(71) Applicants: Steven Joseph Gregorski, Painted Post, NY (US); John Christopher Thomas, Elmira, NY (US); Kevin Lee Wasson, Elmira, NY (US)

(72) Inventors: Steven Joseph Gregorski, Painted Post, NY (US); John Christopher Thomas, Elmira, NY (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 239 days.

(21) Appl. No.: 13/644,578

(22) Filed: Oct. 4, 2012

(65) Prior Publication Data
US 2014/0096565 A1 Apr. 10, 2014

(51) Int. Cl.
*C03B 37/10* (2006.01)

(52) U.S. Cl.
USPC .............................................. 65/510; 65/434

(58) Field of Classification Search
CPC ............................ C03B 2205/55; C03B 37/10
USPC ................................................. 65/343, 510
See application file for complete search history.

(56) References Cited

U.S. PATENT DOCUMENTS

| 6,715,323 | B1 | 4/2004 | Roba |
| 7,937,971 | B2 | 5/2011 | Costello, III et al. |
| 2011/0094717 | A1 | 4/2011 | Cummings |

FOREIGN PATENT DOCUMENTS

WO 2008/066661 6/2008

OTHER PUBLICATIONS

International Search Report, dated Dec. 10, 2013, pp. 1-5, International Patent Application No. PCT/US2013/062840, European Patent Office, The Netherlands.
Written Opinion of the International Searching Authority, Dec. 10, 2013, pp. 1-6, International Patent Application No. PCT/US2013/062840, European Patent Office, The Netherlands.

*Primary Examiner* — Queenie Dehghan
(74) *Attorney, Agent, or Firm* — Svetlana Short

(57) ABSTRACT

Methods and apparatuses for cooling optical fibers are disclosed. In one embodiment, In some embodiments, a cooling apparatus for cooling an optical fiber in a production process includes a channel defined by at least one sidewall assembly and a plurality of interior cavities positioned along the interior of the sidewall assembly. The interior cavities include at least one plenum, a first plurality of fluid supply cavities in fluid communication with the at least one plenum, and a second plurality of fluid supply cavities in fluid communication with the at least one plenum. Cooling fluid is supplied from the at least one plenum to the first plurality of fluid supply cavities in a first direction and the second plurality of fluid supply cavities in a second direction opposite the first direction.

20 Claims, 8 Drawing Sheets

METHODS AND APPARATUSES FOR COOLING OPTICAL FIBERS

BACKGROUND

1. Field

The present specification generally relates to apparatuses and methods of cooling optical fibers and, more specifically, to linear coolers for non-contact cooling of an optical fiber.

2. Technical Background

Thin, flexible optical fibers can be used in various applications for transmitting electrical signals at a high speed. Production of optical fiber generally include drawing an optical fiber from an initial preform and conveying the optical fiber through a variety of stations along a manufacturing line to process the optical fiber for an end-user application. Typically the preform includes a central core of glass surrounded a cladding of glass having a different index of refraction than the core glass. The preform is placed within a furnace and the optical fiber is drawn from the preform to create an uncoated optical fiber.

The optical fiber is cooled as it exits the furnace to enable subsequent processing including, for example, application of coatings and bundling. Cooling of the optical fiber as it exits the furnace, however, may be difficult, as the optical fiber is fragile and contacting the optical fiber may create inclusions in the optical fiber. Conventional coolers, therefore, exhibit lower rates of heat transfer out of the optical fiber, as directing cooling fluid over the optical fiber at high flow rates has proven difficult or costly.

Accordingly, there is a need for apparatuses and methods to cool optical fiber with high rates of cooling without contacting the optical fiber.

SUMMARY

The embodiments described herein relate to apparatuses and methods of cooling optical fiber with high rates of cooling without contacting the optical fiber. The cooling apparatuses introduce a cooling fluid to the optical fiber in opposite directions to manage deflection of the optical fiber as it passes through the cooling apparatus. Parameters of the cooling fluid that cools the optical fiber may be modified to control the cooling rate of the optical fiber as the optical fiber passes through the cooling apparatus.

In some embodiments, a cooling apparatus for cooling an optical fiber in a production process includes a channel defined by at least one sidewall assembly and a plurality of interior cavities positioned along the interior of the sidewall assembly. The interior cavities include at least one plenum, a first plurality of fluid supply cavities in fluid communication with the at least one plenum, and a second plurality of fluid supply cavities in fluid communication with the at least one plenum. Cooling fluid is supplied from the at least one plenum to the first plurality of fluid supply cavities in a first direction and the second plurality of fluid supply cavities in a second direction opposite the first direction.

In other embodiments, a method of cooling an optical fiber includes drawing the optical fiber in a downstream direction along a production line and through a cooling apparatus and injecting a cooling fluid around the optical fiber in the cooling apparatus. The cooling apparatus includes at least one sidewall assembly comprising a channel and a plurality of interior cavities having a plurality of fluid supply cavities in fluid communication with at least one plenum. Cooling fluid is supplied from the at least one plenum to a first plurality of fluid supply cavities in a first direction transverse to a direction of travel of the optical fiber and cooling fluid is supplied from the at least one plenum to a second plurality of fluid supply cavities in a second direction transverse to the direction of travel of the optical fiber and opposite the first direction.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description, serve to explain the principles and operations of the claimed subject matter.

DETAILED DESCRIPTION

Figure 1:
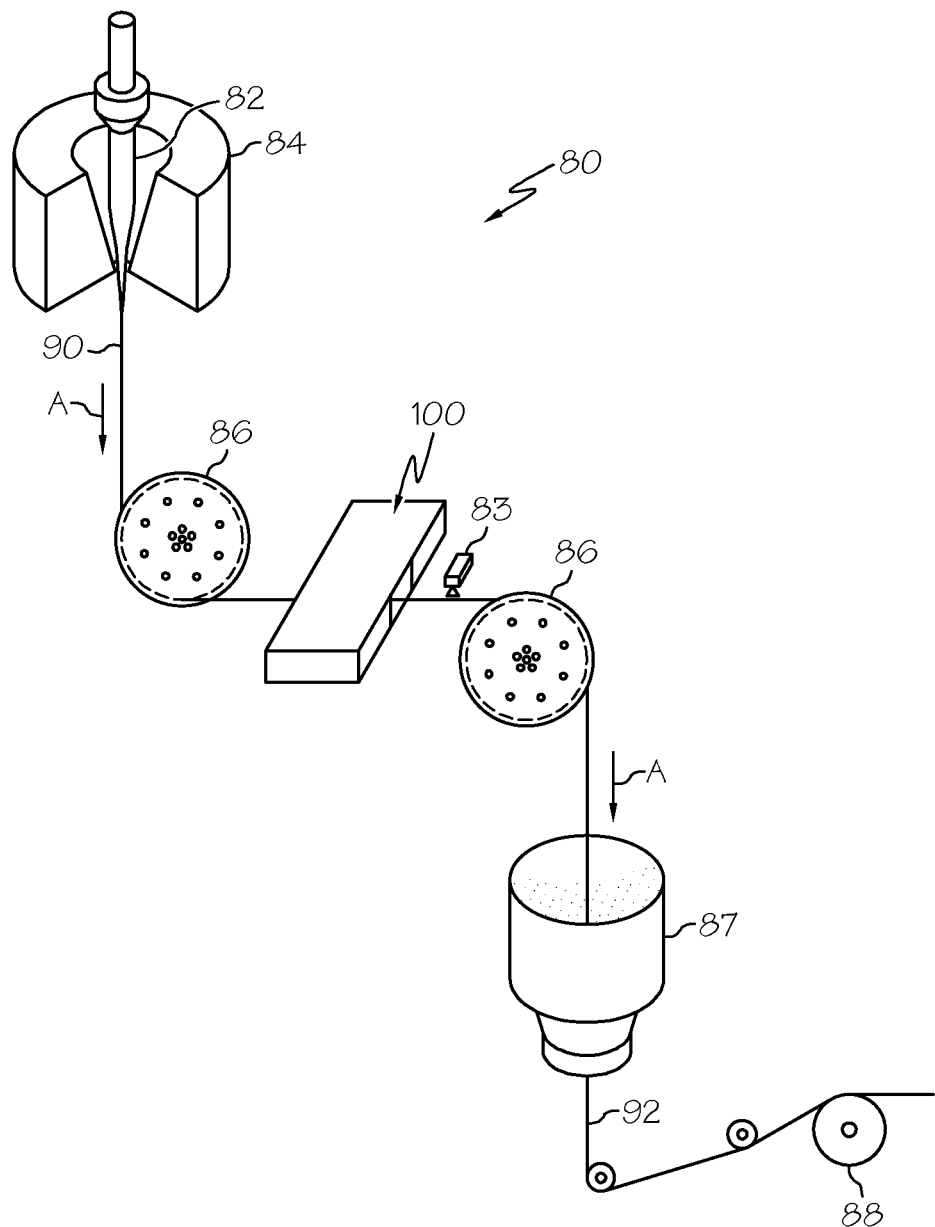
FIG. 1 schematically depicts a production line for producing optical fiber including a cooling apparatus to cool uncoated optical fiber according to one or more embodiments shown or described herein.

Reference will now be made in detail to embodiments of apparatuses and methods for cooling optical fiber in a production process. Whenever possible, the same reference numerals will be used throughout the drawings to refer to the same or like parts. In some embodiments, an apparatus for cooling an uncoated optical fiber includes at least one sidewall assembly that defines a channel through which optical fiber passes. The cooling apparatus includes an internal cavity that is in fluid communication with at least one plenum and a plurality of fluid supply cavities. Cooling fluid is supplied from the plenum to a first plurality of fluid supply cavities in a first flow direction and is supplied from the plenum to a second plurality of fluid supply cavities in a second flow direction opposite the first flow direction. The cooling fluid transfers heat from the uncoated optical fiber, primarily through forced convection. The cooling fluid also applies a force to the optical fiber as it flows past the optical fiber, for example by aerodynamic drag, and may provide a cushion of fluid to maintain spacing between the optical fiber and the cooling apparatus. The orientation of the fluid supply cavities balance the forces applied to the optical fiber and limit the deflection of the optical fiber passing through the cooling apparatus. Methods and apparatuses for cooling optical fiber in a production process will be described in further detail herein with specific reference to the appended drawings.

Referring to FIG. 1, an example of a production line 80 for producing optical fiber in a production process is depicted. An optical fiber preform 82 is positioned within a furnace 84 that heats the preform 82 to an elevated temperature. A portion of the preform 82 is drawn from the remaining preform 82, thereby forming an uncoated optical fiber 90 (also referred to as a "bare" optical fiber). A drawing mechanism 88 applies a draw tension to the optical fiber as the optical fiber is drawn in a "downstream" direction A throughout components of the entire production line 80. In the embodiment depicted in FIG. 1, the uncoated optical fiber 90 contacts a stationary fluid bearing 86, as described in co-assigned U.S. Pat. No. 7,937,971, and enters a cooling apparatus 100. The production line 80 may include a plurality of fluid bearings 86, which modify the orientation of the uncoated optical fiber 90 to position the uncoated optical fiber 90 for operations along the production line 80. Upon exiting the cooling apparatus 100, the temperature of the uncoated optical fiber 90 is reduced as compared with the temperature of the uncoated optical fiber 90 entering the cooling apparatus 100. The production line 80 may include a temperature sensing device 83, for example an infrared thermometer positioned upstream and/or downstream of the cooling apparatus 100 to monitor the temperature of the uncoated optical fiber 90 entering and/or exiting, respectively, the cooling apparatus 100.

With the uncoated optical fiber 90 cooled, the uncoated optical fiber 90 is drawn through a coating applicator 87. A primary protective coating layer is applied to the outer surface of the uncoated optical fiber 90 by the coating applicator 87, thereby forming a coated optical fiber 92. Various protective coatings that are applied to the outer surface of the uncoated optical fiber 90 are conventionally known and include, for example and without limitation, polymeric-based materials.

At positions along the production line 80 upstream of the coating applicator 87, contact between the uncoated optical fiber 90 and the components of the production line 80 is generally undesirable, as mechanical contact with the uncoated optical fiber 90 has a tendency to damage the uncoated optical fiber 90, including the creations of inclusions or defects, which may increase the fragility and/or decrease signal transmission rates of the coated optical fiber 92 when installed by an end-user. At positions along the production line 80 downstream of the coating applicator 87, contact between the coated optical fiber 92 and the components of the production line 80 has a reduced tendency to damage the coated optical fiber 92, such that mechanical contact with the coated optical fiber 92 generally does not substantially affect the quality of the coated optical fiber 92. Accordingly, the cooling apparatus 100 cools the uncoated optical fiber 90 without inducing mechanical contact between the uncoated optical fiber 90 and components of the production line 80, including the cooling apparatus 100 itself. Further, enhanced cooling of the uncoated optical fiber 90 before the uncoated optical fiber 90 is introduced to the coating applicator 87 may increase yields and/or decrease costs associated with the production line 80, as lower cost protective coatings and/or higher coating speeds may be realized by implementing the cooling apparatus 100 described herein into the production line 80.

Figure 2:
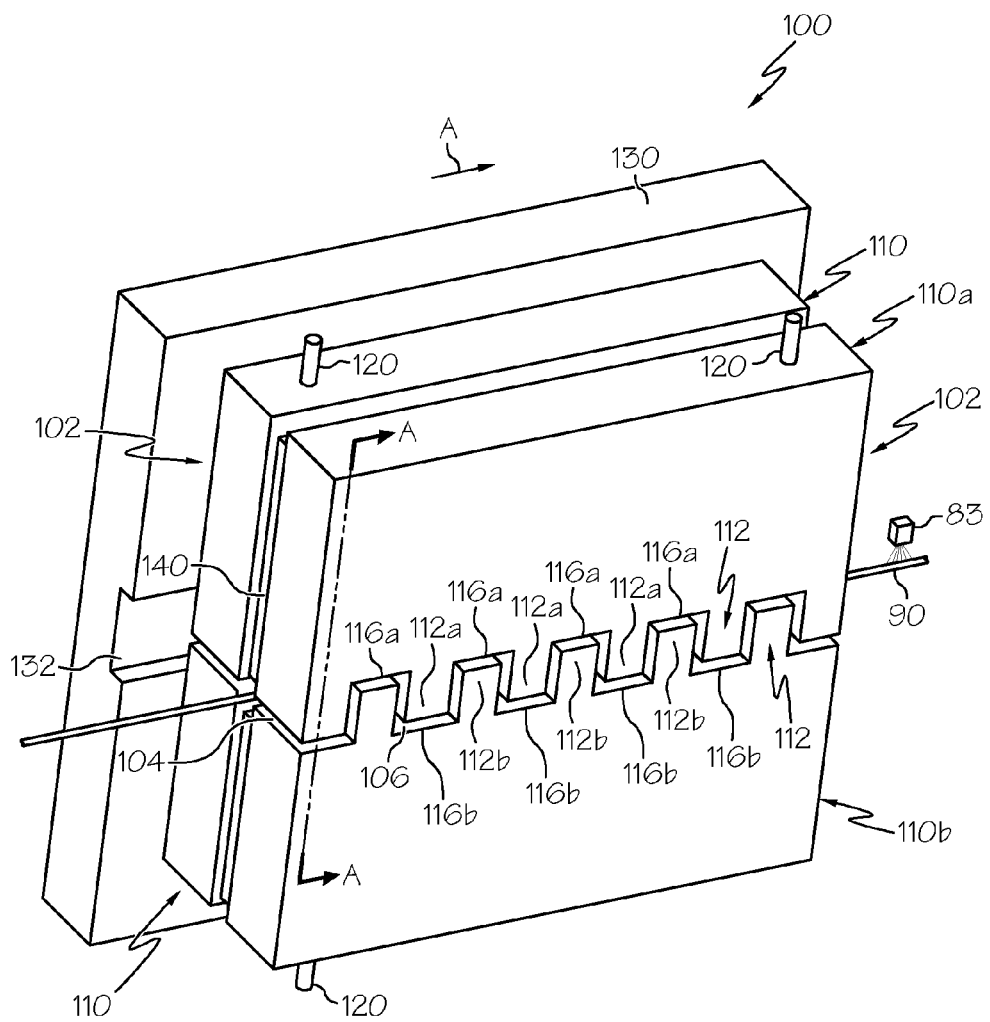
FIG. 2 schematically depicts a front perspective view of a cooling apparatus for cooling optical fiber being drawn along a production line according to one or more embodiments shown or described herein.
Figure 3:
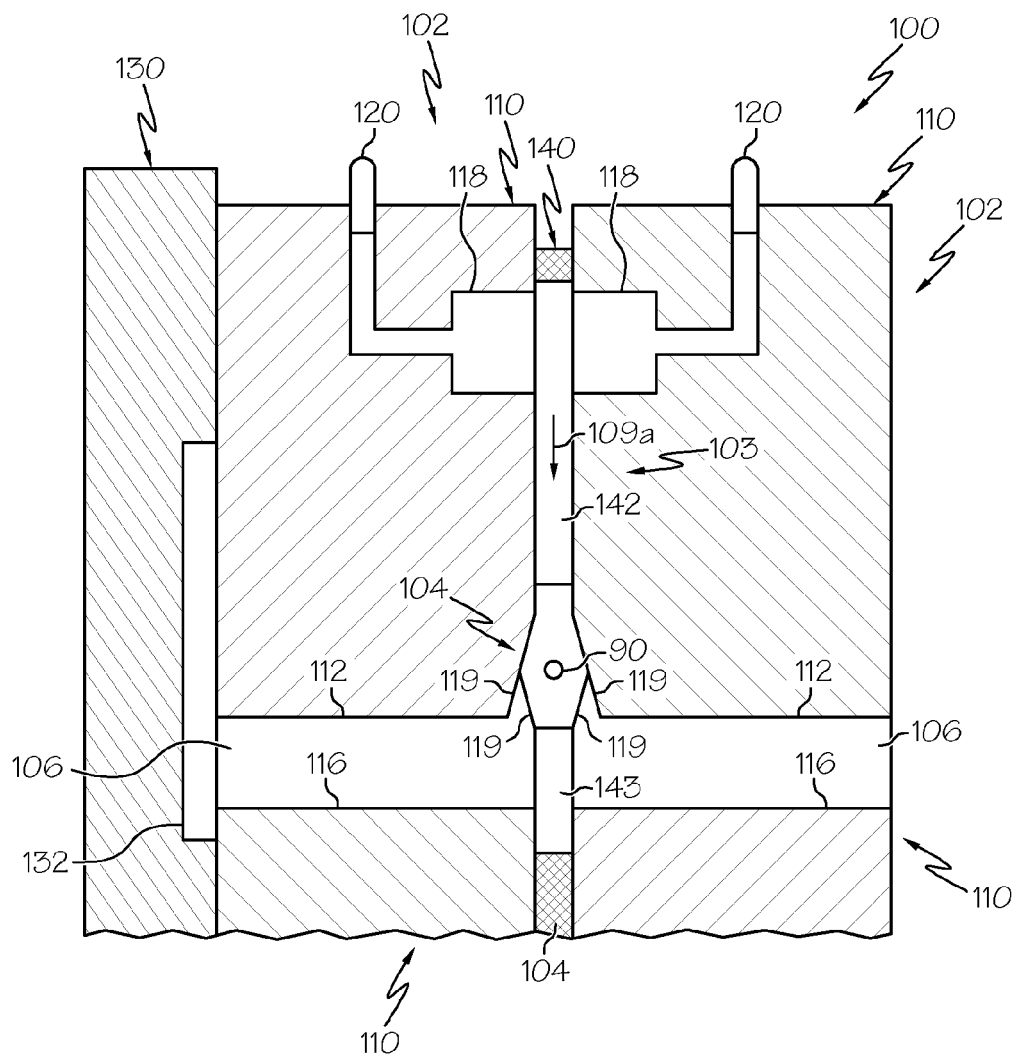
FIG. 3 schematically depicts a side view of a cooling apparatus for cooling optical fiber shown along line A-A of FIG. 2 according to one or more embodiments shown or described herein.
Figure 4:
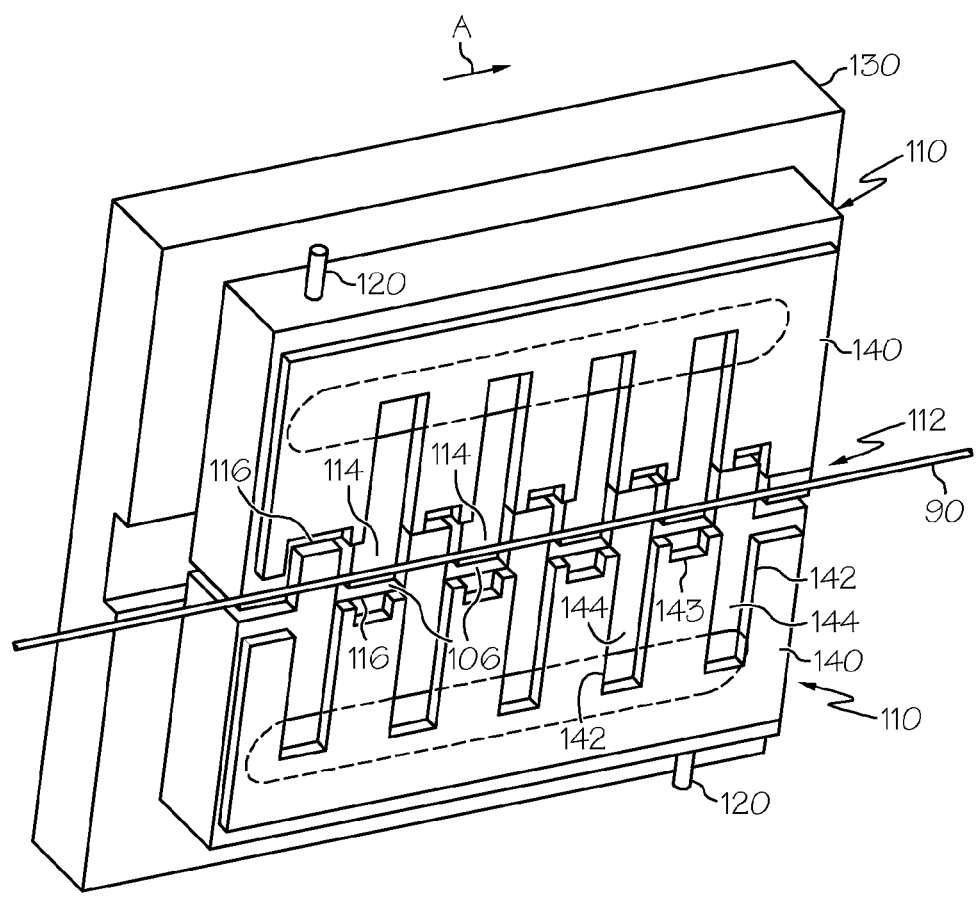
FIG. 4 schematically depicts a front perspective view of a cooling apparatus for cooling optical fiber with certain components omitted for clarity according to one or more embodiments shown or described herein.

Referring now to FIGS. 2-4, one embodiment of a linearly-oriented cooling apparatus 100 is depicted. Certain components of the cooling apparatus 100 depicted in FIG. 2 have been removed for clarity in FIG. 4. Referring to FIG. 2, the cooling apparatus 100 includes sidewalls 110 that are positioned spaced apart from one another. In the embodiment depicted in FIG. 2, the cooling apparatus 100 includes four sidewalls 110 that are identical to one another, and vary only in orientation and relative position. Each of the sidewalls 110 depicted in FIG. 2 include an interleaved portion 112 having a plurality of fingers 114 that are spaced apart from one another and extend outwardly from troughs 116. In the embodiment depicted in FIG. 2, two sidewalls 110a, 110b are clocked about 180 degrees apart from one another, such that the fingers 114a of a first sidewall 110a are positioned proximate to the troughs 116b of the second sidewall 110b, and the fingers 114b of the second sidewall 110b are positioned proximate to the troughs 116a of the first sidewall 110a. Two sidewalls 110 oriented and positioned as such define a sidewall assembly 102. In the embodiment depicted in FIGS. 2 and 3, two sidewall assemblies 102, each having two sidewalls 110 with interleaved portions 112, are positioned proximate to one another and spaced apart by a shim 140, which will be described in greater detail below. The two sidewall assemblies 102 are spaced apart by the shim 140, and the sidewall assemblies 102 define a substantially linear channel 104 through which the uncoated optical fiber 90 drawn to be cooled by the cooling apparatus 100.

As depicted in FIGS. 2 and 3, the fingers 114 and the troughs 116 of adjacent sidewalls 110 in a sidewall assembly 102 may be spaced apart from one another such that each set of fingers 114 and troughs 116 define an exit channel portion 106. As will be described in further detail below, cooling fluid introduced to the cooling apparatus 100 flows into the channel 104 to cool the uncoated optical fiber 90 by forced convection. The cooling fluid exits the cooling apparatus 100 by flowing out of the exit channel portions 106 after flowing over the uncoated optical fiber 90.

In the embodiment of the cooling apparatus 100 depicted in FIGS. 2 and 3, the two sidewall assemblies 102 are coupled to a fixturing plate 130. The sidewall assemblies 102 may be secured to the fixturing plate 130 by a plurality of fasteners and/or other clamping mechanisms (not shown) to couple the sidewalls 110 relative to the fixturing plate 130 and to each other. In some embodiments, locating elements (not shown), for example precision dowel pins, may be inserted into locating holes in both the fixturing plate 130 and the sidewalls 110 adjacent to the fixturing plate 130 as to maintain the position of the sidewalls 110 to the fixturing plate 130. The fixturing plate 130 may include an assembly exit channel 132 to evacuate cooling fluid from the exit channel portions 106 of the rear-side sidewall assembly 102.

Figure 7:
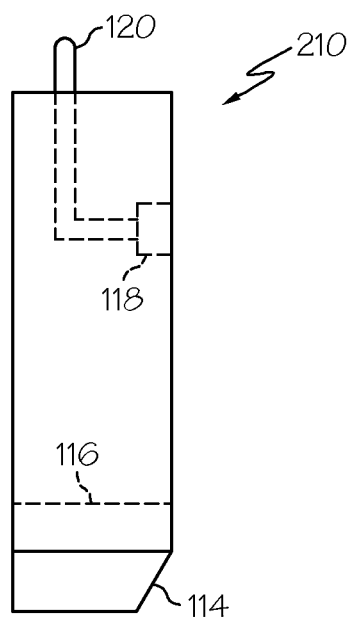
FIG. 7 schematically depicts a side view of a sidewall for a cooling apparatus for cooling optical fiber being drawn along a production line according to one or more embodiments shown or described herein.

Referring now to FIG. 4, the embodiment of the cooling apparatus 100 depicted in FIGS. 2 and 3 is shown with the front-side sidewall 110 removed, as to expose the rear-side sidewall 110 and the shim 140. The shim 140 may define a plurality of internal cavities 103 in the assembled cooling apparatus 102 that direct cooling fluid through the cooling apparatus 100. Similar to the description above, the sidewalls 110 each include an interleaved portion 112 having a plurality of fingers 114 that are spaced apart from one another by troughs 116. Further, as depicted in FIG. 4, each of the sidewalls 110 includes a plenum 118. The plenum 118 extends along a majority of the length of the sidewalls 110. The plenums 118 are in fluid communication with a cooling fluid pressure source (discussed below in regard to FIG. 7) that, in the embodiment depicted in FIG. 3, is routed through fluid connection fittings 120.

Referring to FIGS. 3 and 4, two shims 140 are positioned to contact the two sidewall assemblies 102 when the two sidewall assemblies 102 are positioned proximate to one another. The shims 140, which are depicted as separate components in FIGS. 3 and 4, are thin sheet structures. The shims 140 maintain the spacing between the sidewalls 110, and the shims 140 are spaced apart from one another in the region surrounding the uncoated optical fiber 90 to define the channel 104. In one embodiment, the shims 140 are made from sheet stock having a thickness of about 0.006 inches, such that spacing between the sidewall assemblies 102 is about 0.006 inches. The shims 140 are substantially planar, such that when the shims 140 are positioned between the sidewalls 110 and secured, the shims 140 inhibit fluid flow across the solid regions of the shims 140, and instead allow fluid flow in regions of the relief openings 142 and the exit openings 143, as will be discussed further below. In the embodiments depicted in FIGS. 2-4, the channel 104 is generally free of obstructions such that the uncoated optical fiber 90 passes through the cooling apparatus 100 without contacting any components of the cooling apparatus 100.

Figure 5:
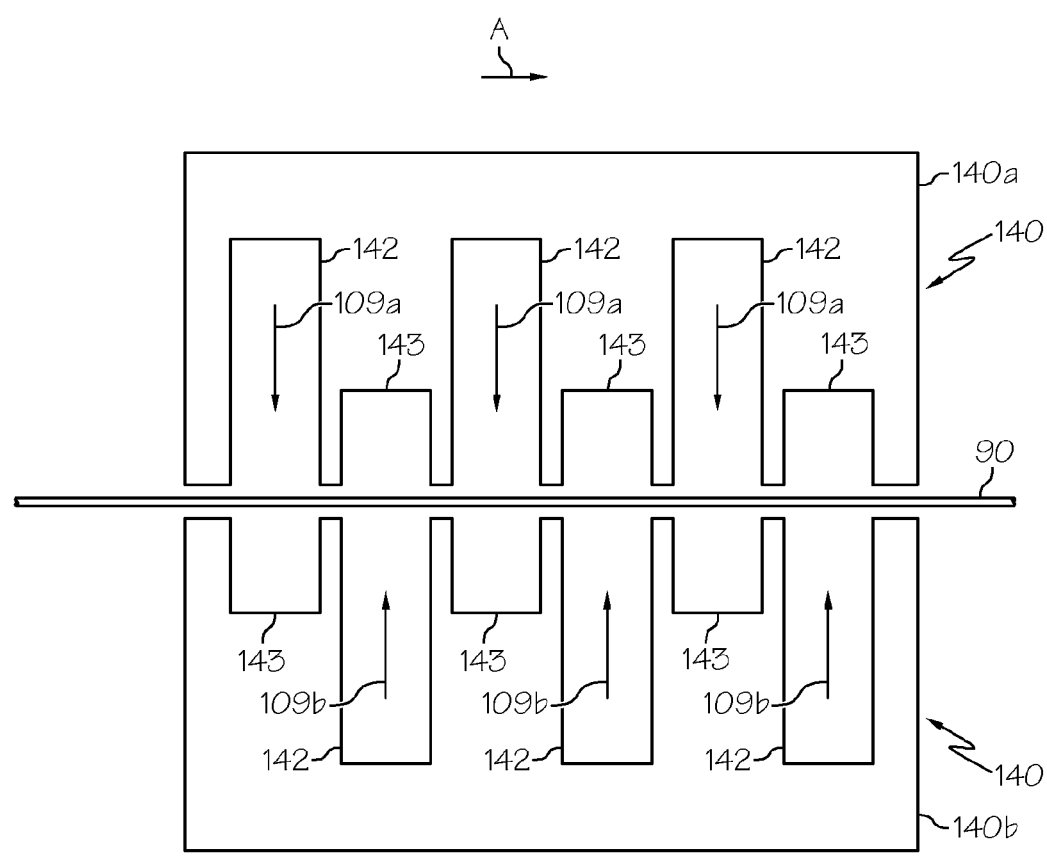
FIG. 5 schematically depicts a front view of shims for a cooling apparatus for cooling optical fiber being drawn along a production line according to one or more embodiments shown or described herein.

Referring now to FIGS. 4 and 5, the shims 140 include a plurality of relief openings 142 that extend a depth away from the channel 104, and are spaced apart from one another at a distance that generally corresponds to the spacing of the fingers 114 and the troughs 116 of the sidewalls 110. The shims 140 also include a plurality of exit openings 143 that are positioned between the relief openings 142 such that when the shims 140 are oriented and positioned relative to one another, the exit openings 143 of a first shim 140 are positioned adjacent to the relief openings 142 of a second shim, and the exit openings 143 of the second shim are positioned adjacent to the relief openings 142 of the first shim. The relief openings 142 generally extend from the plenum 118 to interleaved portions 112 of the sidewalls 110. When assembled between two sidewall assemblies 102, the relief openings 142 each define a fluid supply cavity 144 that is in fluid communication with the plenum 118. Cooling fluid introduced to the plenum 118 at an elevated pressure will flow from the plenum 118, through the fluid supply cavity 144 into the channel 104 and across the uncoated optical fiber 90, and through the exit openings 143 and the exit channel portions 106 of the sidewall assembly 102, between the fingers 114 and the troughs 116 of the interleaved sidewalls 110.

The orientation of the relief openings 142 and the exit openings 143, along with the position of the plenum 118, as depicted in FIGS. 4 and 5, control the general direction of the cooling flow within the cooling apparatus 100. As discussed hereinabove, the sidewall assemblies 102 define a channel 104 through which the uncoated optical fiber 90 is drawn in the draw direction A. The relief openings 142 and the exit openings 143 are arranged such that cooling air flows in a first direction 109a in a first fluid supply cavity 144 defined by a first relief opening 142, and cooling air flows in a second direction 109b in a second fluid supply cavity 144 defined by a second relief opening 142 positioned sequentially along the cooling apparatus 100 in the draw direction A of the uncoated optical fiber 90. Because the relief openings 142 of the two shims 140 are spaced laterally from one another, the direction of fluid flow through one shim 140 may be in one direction for all of the relief openings 142. As depicted in FIG. 5, the cooling fluid flows in the first direction 109a through the relief openings 142 in the upper shim 140a, and in the second direction 109b for the relief openings 142 in the lower shim 140b. Cooling fluid that is introduced from sequential fluid supply cavities 144 flows in opposite directions from one another.

Cooling fluid exiting the plenum 118 along one of the fluid supply cavities 144 typically flows within the volume created by the relief openings 142 in the shims 140 and the sidewalls 110 (i.e., the fluid supply cavities 144). The cooling fluid flows into the channel 104, over the uncoated optical fiber 90, and into the volume created by the exit openings 143 in the shims 140 and the sidewalls 110. Once in the exit opening 143, the cooling air typically exits the cooling apparatus 100 through the exit channel portions 106 between the interleaved sidewalls 110. The cooling air exiting a fluid supply cavity 144 generally exits the cooling apparatus 100 in substantial portion through the exit channel portion 106 positioned opposite the channel 104. However, it is typical for some of the cooling fluid to become entrained with the uncoated optical fiber and/or the surrounding fluid supply cavities 144 such that a portion of the fluid exiting a fluid supply cavity 144 does not exit the cooling apparatus 100 though the exit channel portion 106 positioned opposite the channel 104.

As the cooling fluid flows over the uncoated optical fiber 90, heat is transferred from the hot uncoated optical fiber 90 to the relatively cool cooling fluid. Heat may be transferred from the uncoated optical fiber 90 to the cooling fluid by forced convection. Heat may also be transferred from the uncoated optical fiber 90 to the cooling apparatus 100 itself by radiation. For many operating conditions, forced convection will be the dominant heat transfer mode. Further, the flow of the cooling fluid around the uncoated optical fiber 90 applies a force to the uncoated optical fiber 90 in the direction of cooling fluid flow, which is generally attributed to aerodynamic drag on the uncoated optical fiber 90. The force has a tendency to deflect the uncoated optical fiber 90 in the direction of cooling fluid flow away transverse from the draw direction of the uncoated optical fiber. By arranging the relief openings 142 in the shim 140 and the fingers 114 and the troughs 116 of the sidewalls 110 such that the flow direction of the cooling fluid alternates between adjacent fluid supply cavities 144, defection of the uncoated optical fiber 90 may be controlled such that the uncoated optical fiber 90 remains spaced apart from the components of the cooling apparatus 100.

Referring again to FIG. 3, the spacing between the sidewall assemblies 102 in positions of the shims 140 is smaller than the spacing between the fingers 114 and the troughs 116 of the sideplates 110. The increasing in relative spacing between the fingers 114 and the troughs 116 reflects an increase in the cross-sectional area of the exit channel portions 106 relative to the fluid supply cavities 144. The increase in cross sectional area of the exit channel portions 106 reduces flow restrictions to cooling fluid flow, and decreases the speed of the cooling fluid once the cooling fluid flows beyond the channel 104. The reduction in flow restrictions of the cooling fluid may result in an increased cooling fluid flow rate for a fixed pressure as compared to a cooling apparatus 100 that does not include increased cross-sectional areas of the exit channels positioned on the far side of the channel 104.

Still referring to FIG. 3, the fingers 114 of the sidewalls 110 may include a tapered portion 119 that tapers the channel 104 open in the direction of cooling fluid flow from the plenum 118 to the exit channel portion 106. The tapered portion 119 may be at an angle from about 0 degrees to about 10 degrees from the planar surfaces of the shim 140, including a tapered portion 119 that is tapered at about 0.6 degrees. As depicted in FIG. 3, the severity of the tapered portion 119 is exaggerated for illustrative purposes. The tapered portion 119 creates a channel 104 having a narrower width along the side where the cooling fluid enters the channel 104 from the fluid supply cavities 144, and a wider width along the side where the cooling fluid exits the channel 104 through the exit channel portions 106. The tapered portion 119 may assist with locating the uncoated optical fiber 90 at a particular position within the channel 104.

As discussed hereinabove, the cooling apparatus 100 maintains spacing of the uncoated optical fiber 90 and the components of the cooling apparatus 100 by maintaining a "cushion of fluid" between the uncoated optical fiber 90 and the channel 104. The intensity of the forces applied to the uncoated optical fiber 90 may be affected by the local cross-sectional area of the channel 104 (i.e., the tapered portion 119). Further, the uncoated optical fiber 90 may be positioned within the channel 104 that is from about 1 to about 2 times the optical fiber diameter, for example from about 1 to about 1.75 times the optical fiber diameter, for example from about 1 to about 1.5 times the optical diameter. Cooling apparatuses 100 that incorporate such low clearances between the uncoated optical fiber 90 and the channel 104 may cause the uncoated optical fiber 90 to be self-centering in the channel 104 due to the Bernoulli effect. As the uncoated optical fiber 90 gets closer to a surface defining the channel 104, the velocity of the cooling fluid will decrease between the uncoated optical fiber 90 and the closest surface of the channel 104 due to a relative increase in drag, and the velocity will increase between the uncoated optical fiber and the furthest surface of the channel 104.

Without being bound by theory, according to the Bernoulli Effect, an increase in fluid velocity occurs simultaneously with a decrease in pressure. As a result, the greater pressure caused by the decreased fluid flow near the nearest surface of the channel 104 will force the uncoated optical fiber back 90 into the center of channel 104. Thus, in some embodiments, the uncoated optical fiber 90 is centered within the channel 104 at least partially via the Bernoulli effect due to a fluid stream which is passing around the uncoated optical fiber 90 and out of the channel 104 while the fiber is being drawn transverse to the direction of flow of the cooling fluid. Notably, such centering occurs without having to utilize any flow of fluid which would impinge upon the fiber from the side thereof, e.g., there are no jets of fluid flow employed which emanate normal to the direction of flow of the cooling fluid. The velocity of the fluid stream traveling through the slot may be adjusted to maintain the uncoated optical fiber 90 so that the uncoated optical fiber 90 is located entirely over the tapered portion 119 of the channel 104.

Forces applied to the uncoated optical fiber 90 by the plurality of fluid streams from the fluid supply cavities 144 of the cooling apparatus 100 may be balanced in the first and second direction of fluid flow, such that the forces applied to the uncoated optical fiber 90 are equal. With equal and offsetting forces applied to the uncoated optical fiber 90, the deflection of the uncoated optical fiber 90 caused by forces and moment loads attributed to aerodynamic drag applied to the uncoated optical fiber 90, may be may be regular and repeatable for any amount of draw tension applied to the uncoated optical fiber 90. Further, the forces applied to the uncoated optical fiber 90, and therefore the deflection of the uncoated optical fiber 90, may be regular and repeatable for any amount of fluid flow directed over the uncoated optical fiber 90. As such, cooling the uncoated optical fiber 90 using a cooling apparatus 100 described herein may offer improved flexibility of heat transfer rates of the uncoated optical fiber, such that the heat transfer rate applied to the uncoated optical fiber 90 may be increased or decreased by increasing or decreasing, respectively, the pressure of the cooling fluid introduced to the cooling apparatus 100. As such, the rate of cooling of the uncoated optical fiber 90 may be regulated as desired.

Figure 6:
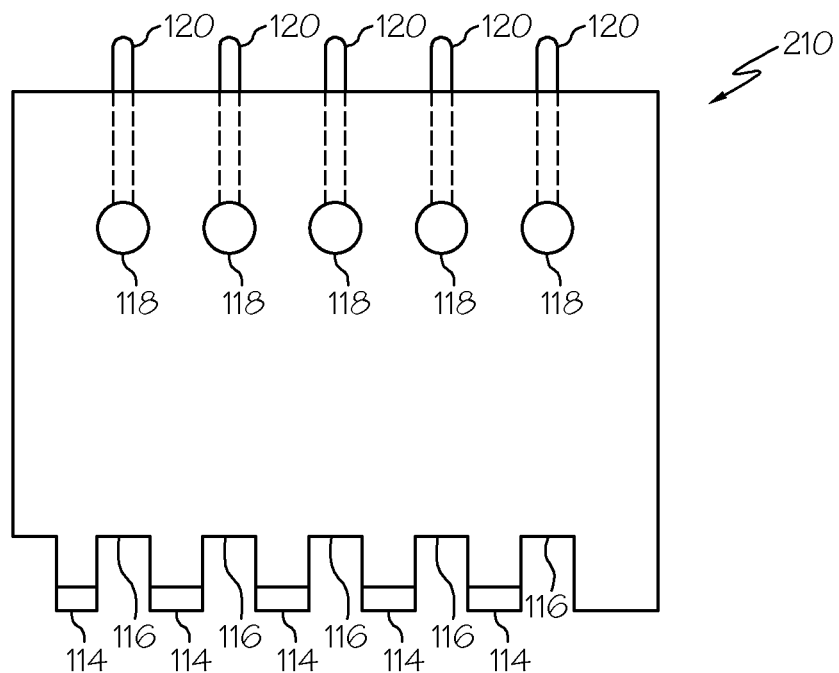
FIG. 6 schematically depicts a front view of a sidewall for a cooling apparatus for cooling optical fiber being drawn along a production line according to one or more embodiments shown or described herein.

In other embodiments, forces applied to the uncoated optical fiber 90 may be unbalanced in the first and second direction of fluid flow, such that the forces applied to the uncoated optical fiber 90 may be unequal. As such, the forces and moment loads applied to the uncoated optical fiber 90 attributed to aerodynamic drag may tend to translate the uncoated optical fiber 90 away from the center of the channel 104. To accommodate translation of the uncoated optical fiber 90 within the channel 104, the channel 104 itself may be shaped to minimize contact with the uncoated optical fiber 90 when the uncoated optical fiber 90 is translated Referring now to FIGS. 6 and 7, another embodiment of a sidewall 210 used in the cooling apparatus 100 is depicted. The sidewall 210 includes a plurality of plenums 118 that are each independently plumbed to a cooling fluid supply. The pressure and flow rates of cooling fluid introduced to each of the plenums 118 through the corresponding fluid connection fittings 120 can be adjusted such that the each of the corresponding fluid supply cavities (as shown in FIGS. 2-4) formed by the sidewalls 210 and the shims 140 each have cooling fluid at a pressure and a flow rate that may be different than the surrounding fluid supply cavities.

Because the pressure and the flow rate of the of the cooling fluid exiting each of the plenums 118 may vary, the rate of heat transfer from the uncoated optical fiber 90 may similarly vary for each fluid supply cavity, based on the pressure and flow rate of the cooling fluid exiting each of the plenums 118. Further, the forces applied to the uncoated optical fiber 90 by the cooling fluid may vary in intensity based on the pressure and flow rate of the cooling fluid exiting each of the plenums 118. In particular, the pressure and flow rate of the cooling fluid may be modified to balance the forces and moment loads applied to the uncoated optical fiber 90 by aerodynamic drag, such that the maximum displacement of the uncoated optical fiber 90 away from the center of the channel 104 is minimized. In particular, by varying the pressure and flow rates of the cooling flow out of each of the plenums, reduction in the deflection due to the application of moment loads by the cooling fluid to the uncoated optical fiber 90 may reduced total deflection of the uncoated optical fiber 90. By modifying the pressures and the flow rates to minimize deflection of the uncoated optical fiber 90, the tendency for contact between the uncoated optical fiber 90 and the components of the cooling apparatus 100 may be reduced.

Figure 8:
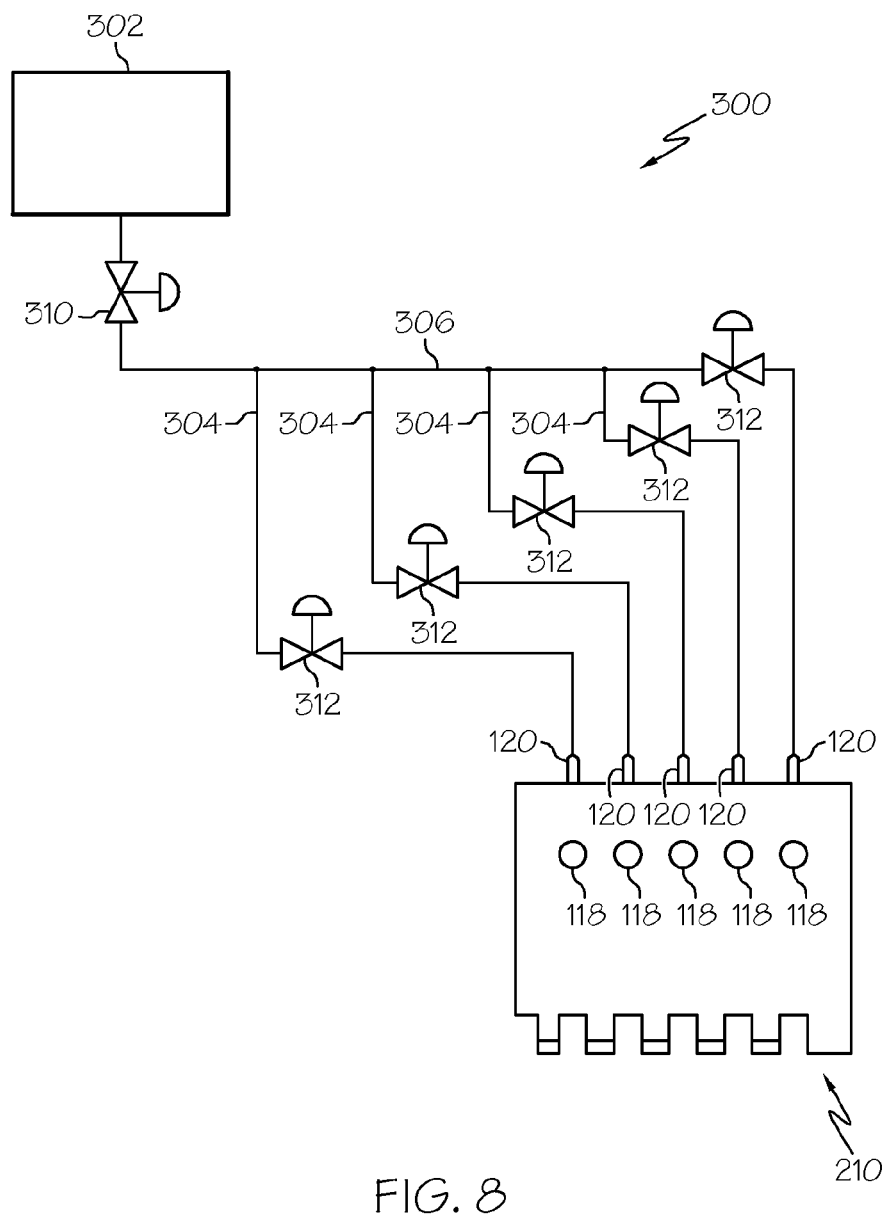
FIG. 8 schematically depicts a fluid supply assembly coupled to a sidewall for a cooling apparatus according to one or more embodiments shown or described herein.

Referring now to FIG. 8, one embodiment of a fluid supply assembly 300 that supplies cooling fluid to the sidewall 210 having a plurality of plenums 118 is depicted. The cooling fluid pressure source provides cooling fluid at a regulated pressure to the cooling apparatus 100. Examples of cooling fluids include, without limitations, air, helium, nitrogen, and the like. In some embodiments, using air as the cooling fluid may be desired to reduce costs of operation of the cooling apparatus 100 and to eliminate a need to capture cooling fluid used in the production process to cool the uncoated optical fiber 90. The depicted embodiment of the fluid supply assembly 300 includes a fluid pressure source 302 that is fluidically coupled to a plurality of fluid supply lines 304. The fluid supply assembly 300 is coupled to a manifold 306 that distributes the cooling fluid to a plurality of fluid connection fittings 120, which are in fluid communication with the plenums 118. The fluid supply assembly 300 further includes a plurality of regulators 312, or valves, which may be selectively adjusted towards an opened position or a closed position to provide the required pressure and fluid flow of the cooling fluid to the plenums 118. Embodiments of the fluid supply assembly 300 may also include a master flow regulator 310 that can be adjusted to change the overall delivery of cooling fluid to the plenums 118, but without upsetting the general balance of pressures and fluid flow set by the regulators 312.

Figure 9:
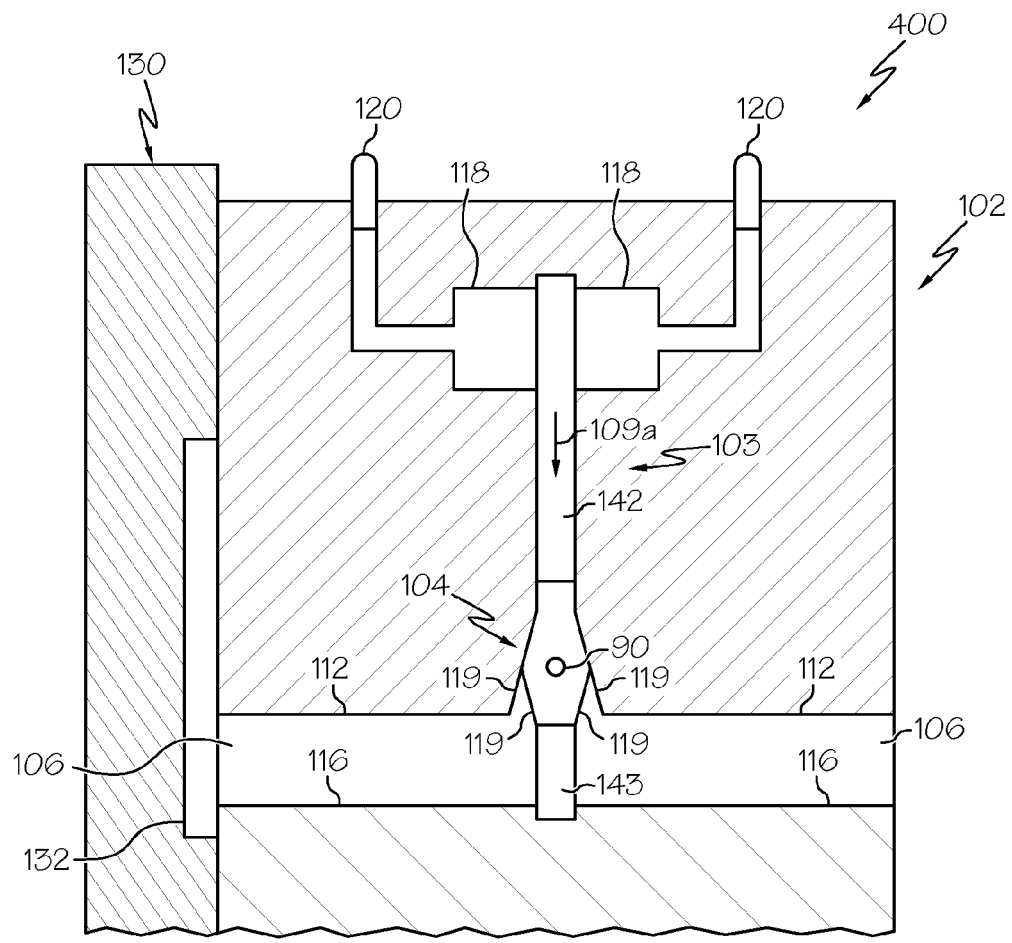
FIG. 9 schematically depicts a side view of a cooling apparatus for cooling optical fiber shown along line A-A of FIG. 2 according to one or more embodiments shown or described herein.

Referring now to FIG. 9, another embodiment of the cooling apparatus 400 is depicted. In this embodiment, the cooling apparatus 400 includes two sidewall assemblies 102 that integrally formed such that the internal cavities 103 defining the plenums 118 and the fluid supply cavities 144 are integrally formed within the sidewall assembly 102. In such embodiments, components such as the relief openings 142, the exit openings 143, the plurality of fingers 114 and the troughs 116 may be integrally formed with one another. Such embodiments may be produced according to a variety of methods including rapid prototyping techniques, including selective laser sintering, direct metal laser sintering, fusion deposition modeling, stereolithography, laminated object manufacturing, electron beam melting, powder bed and/or inkjet head printing, and the like. In the embodiment depicted in FIG. 9, the cooling apparatus 400 includes two sidewall assemblies 102, however, it should be understood that some embodiments of the cooling apparatus 400 may include a single sidewall assembly 102 that integrally includes all of the features defining the internal cavities 103. Forming the cooling apparatus 400 to include internal cavities 103 that are integral to the sidewall assemblies 102 may reduce leakage of cooling fluid and may improve cooling performance of the cooling apparatus 400 for a fixed amount of cooling fluid.

It should now be understood that production lines for producing optical fibers may include a cooling apparatus that provides cooling fluid to the optical fiber to decrease the temperature of the optical fiber for subsequent processes. The cooling apparatus introduces cooling fluid to the optical fiber at speeds that induce aerodynamic drag into the optical fiber at directions transverse to the draw direction of the optical fiber. The cooling apparatus includes a plurality of fluid supply cavities that introduce cooling fluid in sequentially opposite directions along the cooling apparatus, such that deflection due to the aerodynamic drag is minimized and contact between the optical fiber and the cooling apparatus is minimized. The cooling device may include a plurality of plenums that feed individually regulated cooling fluid to the fluid supply cavities to manage heat transfer rates and force and moment load application.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

In a first aspect, the disclosure provides a cooling apparatus for cooling an optical fiber in a production process, the cooling apparatus comprising: a channel defined by at least one sidewall assembly; and a plurality of interior cavities positioned along the interior of the sidewall assembly, the interior cavities comprising at least one plenum, a first plurality of fluid supply cavities in fluid communication with the at least one plenum, and a second plurality of fluid supply cavities in fluid communication with the at least one plenum, wherein a cooling fluid is supplied from the at least one plenum to the first plurality of fluid supply cavities in a first direction and the second plurality of fluid supply cavities in a second direction opposite the first direction.

In a second aspect, the disclosure provides a method of cooling an optical fiber comprising: drawing the optical fiber in a downstream direction along a production line and through a cooling apparatus; and injecting a cooling fluid around the optical fiber in the cooling apparatus, the cooling apparatus comprising at least one sidewall assembly comprising a channel and a plurality of interior cavities comprising a plurality of fluid supply cavities in fluid communication with at least one plenum, wherein the cooling fluid is supplied from the at least one plenum to a first plurality of fluid supply cavities in a first direction transverse to a direction of travel of the optical fiber and cooling fluid is supplied from the at least one plenum to a second plurality of fluid supply cavities in a second direction transverse to the direction of travel of the optical fiber and opposite the first direction.

In a third aspect, the disclosure provides the cooling apparatus of the first through second aspects, wherein the at least one sidewall assembly comprises: a first sidewall and a second sidewall spaced apart from one another; and at least one shim positioned between first and the second sidewalls, the shim defining the plurality of interior cavities.

In a fourth aspect, the disclosure provides the cooling apparatus of the first through third aspects, wherein the second plurality of fluid supply cavities are spaced between the first plurality of fluid supply cavities along the channel.

In a fifth aspect, the disclosure provides the cooling apparatus of the first through fourth aspects, wherein cooling fluid is supplied to the first plurality of fluid supply cavities from a first plenum and cooling fluid is supplied to the second plurality of fluid supply cavities from a second plenum.

In a sixth aspect, the disclosure provides the cooling apparatus of the first through fifth aspects, wherein the at least one plenum comprises a plurality of plenums each supplying one of the plurality of fluid supply cavities.

In a seventh aspect, the disclosure provides the cooling apparatus of the sixth aspects, further comprising a plurality of regulators in fluid communication with a cooling fluid supply and the plurality of plenums, such that cooling fluid introduced to each of the plurality of plenums is regulated.

In an eighth aspect, the disclosure provides the cooling apparatus of the first through seventh aspects, wherein the sidewall assembly comprises a plurality of exit channel portions in fluid communication with at least one of the fluid supply cavities, each of the plurality of exit channel portions are positioned opposite the channel from each of the fluid supply cavities and each of the exit channel portions having an exit cross-sectional area greater than a cooling-flow cross-sectional area of the fluid supply cavity evaluated at the channel.

In a ninth aspect, the disclosure provides the cooling apparatus of the first through eighth aspects, wherein the channel is tapered open in a direction of fluid flow from the at least one plenum to the exit channel portions, such that the channel increases in width in the direction of fluid flow of the cooling fluid.

In a tenth aspect, the disclosure provides the cooling apparatus of the ninth aspect, wherein the channel is tapered from about 0 degrees to about 10 degrees.

In an eleventh aspect, the disclosure provides the cooling apparatus of the eighth aspect, wherein cooling fluid introduced to each of the fluid supply cavities flows over the channel and through the corresponding exit channel portion in substantial portion.

In an twelfth aspect, the disclosure provides the cooling apparatus of the eighth aspect, wherein a portion of the cooling fluid introduced to one of the fluid supply cavities flows into the channel and flows through an exit channel portion not opposite the fluid supply cavity.

In a thirteenth aspect, the disclosure provides the cooling apparatus of the first through twelfth aspects, wherein cooling fluid introduced to the fluid supply cavities in the first direction applies a force to the optical fiber in equal magnitude as the cooling fluid introduced to the fluid supply cavities in the second direction.

In a fourteenth aspect, the disclosure provides the cooling apparatus of the first through twelfth aspects, wherein cooling fluid introduced to the fluid supply cavities in the first direction applies a force to the optical fiber in unequal magnitude to the cooling fluid introduced to the fluid supply cavities in the second direction.

In a fifteenth aspect, the disclosure provides the method of the second aspect, wherein the cooling apparatus further comprises a plurality of exit channel portions in fluid communication with at least one of the fluid supply cavities, the exit channel portions having an exit cross-sectional area greater than a cooling-flow cross-sectional area of the fluid supply cavity evaluated at the channel as to reduce restriction to cooling fluid flowing from the fluid supply cavities, across the channel, and towards the exit channel portions.

In a sixteenth aspect, the disclosure provides the method of the second and fifteenth aspects, wherein the channel is tapered open in a direction of fluid flow across the channel such that fluid pressure across the channel decreases with increasing distance from the fluid supply cavities.

In a sixteenth aspect, the disclosure provides the method of the second and fifteenth through sixteenth aspects, wherein the cooling fluid introduced to the fluid supply cavities in the first direction applies a force to the optical fiber in fiber equal in magnitude as the cooling fluid introduced to the fluid supply cavities in the second direction, such that forces applied to the optical fiber in directions transverse to the direction of travel of the optical fiber are balanced.

In a seventeenth aspect, the disclosure provides the method of the second and fifteenth through sixteenth aspects, wherein the at least one plenum comprises a plurality of plenums each supplying one of the plurality of fluid supply cavities and a plurality of regulators in fluid communication with a cooling fluid supply and the plurality of plenums, such that cooling fluid introduced to each of the plurality of plenums is regulated to balance forces and moment loads applied to the optical fiber in directions transverse to the direction of travel of the optical fiber.

In a eighteenth aspect, the disclosure provides the method of the seventeenth aspect, further comprising adjusting a pressure of the cooling fluid introduced to each of the plurality of plenums to maintain a spacing between the optical fiber and the channel.

In a nineteenth aspect, the disclosure provides the method of the sec and fifteenth through eighteenth aspects, further comprising modifying a flow rate of the cooling fluid through the fluid supply cavities in the cooling apparatus to control a temperature of the optical fiber passing through the cooling apparatus.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A cooling apparatus for cooling an optical fiber in a production process, the cooling apparatus comprising:
   at least one sidewall assembly having at least one interleaved portion, the at least one interleaved portion comprising a plurality of fingers that are spaced apart from each other and that extend outwardly from a plurality of troughs;
   a channel defined by the at least one sidewall assembly, the channel defining a linear pathway; and
   a plurality of interior cavities positioned along the interior of the sidewall assembly, the interior cavities comprising at least one plenum, a first plurality of fluid supply cavities in fluid communication with the at least one plenum, and a second plurality of fluid supply cavities in fluid communication with the at least one plenum, wherein a cooling fluid is supplied from the at least one plenum to the first plurality of fluid supply cavities in a first direction and the second plurality of fluid supply cavities in a second direction opposite the first direction, and wherein both the first direction and the second direction are transverse to the linear pathway defined by the channel.

2. The cooling apparatus of claim 1, wherein the at least one sidewall assembly comprises:
   a first sidewall and a second sidewall spaced apart from one another, each of the first and second sidewalls having an interleaved portion, the interleaved portion comprising a plurality of fingers that are spaced apart from each other and that extend outwardly from a plurality of troughs, and wherein each of the plurality of fingers of the interleaved portion of the first sidewall are positioned proximate to each of the plurality of troughs of the interleaved portion of the second sidewall, and each of the plurality of fingers of the interleaved portion of the second sidewall are positioned proximate to each of the plurality of troughs of the interleaved portion of the first sidewall; and
   at least one shim positioned between the first and the second sidewalls, the shim defining the plurality of interior cavities.

3. The cooling apparatus of claim 1, wherein the second plurality of fluid supply cavities are spaced between the first plurality of fluid supply cavities along the channel.

4. The cooling apparatus of claim 1, wherein cooling fluid is supplied to the first plurality of fluid supply cavities from a first plenum and cooling fluid is supplied to the second plurality of fluid supply cavities from a second plenum.

5. The cooling apparatus of claim 1, wherein the at least one plenum comprises a plurality of plenums each supplying one of the plurality of fluid supply cavities.

6. The cooling apparatus of claim 5, further comprising a plurality of regulators in fluid communication with a cooling fluid supply and the plurality of plenums, such that cooling fluid introduced to each of the plurality of plenums is regulated.

7. The cooling apparatus of claim 1, wherein the plurality of fingers and the plurality of troughs of the at least one interleaved portion of the at least one sidewall assembly define a plurality of exit channel portions in fluid communication with at least one of the fluid supply cavities, each of the plurality of exit channel portions are positioned opposite the channel from each of the fluid supply cavities and each of the plurality of exit channel portions having an exit cross-sectional area greater than a cooling-flow cross-sectional area of the fluid supply cavity evaluated at the channel.

8. The cooling apparatus of claim 7, wherein the channel is tapered open in a direction of fluid flow from the at least one plenum to the exit channel portions, such that the channel increases in width in the direction of fluid flow of the cooling fluid.

9. The cooling apparatus of claim 8, wherein the channel is tapered up to about 10 degrees, as measured from a planar surface of a shim positioned in the at least one sidewall assembly.

10. The cooling apparatus of claim 7, wherein a substantial portion of the cooling fluid introduced to each of the fluid supply cavities flows over the channel and through the corresponding exit channel portion.

11. The cooling apparatus of claim 7, wherein a portion of the cooling fluid introduced to one of the fluid supply cavities flows into the channel and flows through an exit channel portion not opposite the fluid supply cavity.

12. The cooling apparatus of claim 1, wherein cooling fluid introduced to the fluid supply cavities in the first direction applies a force to the optical fiber in equal magnitude as the cooling fluid introduced to the fluid supply cavities in the second direction.

13. The cooling apparatus of claim 1, wherein cooling fluid introduced to the fluid supply cavities in the first direction applies a force to the optical fiber in unequal magnitude to the cooling fluid introduced to the fluid supply cavities in the second direction.

14. A method of cooling an optical fiber comprising:
drawing the optical fiber in a downstream direction along a production line and through a cooling apparatus; and
injecting a cooling fluid around the optical fiber in the cooling apparatus, the cooling apparatus comprising
at least one sidewall assembly having at least one interleaved portion, the at least one interleaved portion comprising a plurality of fingers that are spaced apart from each other and that extend outwardly from a plurality of troughs;
a channel defined by the at least one sidewall assembly, the channel defining a linear pathway; and
a plurality of interior cavities positioned along the interior of the sidewall assembly, the interior cavities comprising at least one plenum, a first plurality of fluid supply cavities in fluid communication with the at least one plenum, and a second plurality of fluid supply cavities in fluid communication with the at least one plenum, wherein the cooling fluid is supplied from the at least one plenum to the first plurality of fluid supply cavities in a first direction and the second plurality of fluid supply cavities in a second direction opposite the first direction, and wherein both the first direction and the second direction are transverse to the linear pathway defined by the channel.

15. The method of claim 14, wherein the cooling apparatus further comprises a plurality of exit channel portions in fluid communication with at least one of the fluid supply cavities, the exit channel portions having an exit cross-sectional area greater than a cooling-flow cross-sectional area of the fluid supply cavity evaluated at the channel as to reduce restriction to cooling fluid flowing from the fluid supply cavities, across the channel, and towards the exit channel portions.

16. The method of claim 14, wherein the channel is tapered open in a direction of fluid flow across the channel such that fluid pressure across the channel decreases with increasing distance from the fluid supply cavities.

17. The method of claim 14, wherein the cooling fluid introduced to the fluid supply cavities in the first direction applies a force to the optical fiber in fiber equal in magnitude as the cooling fluid introduced to the fluid supply cavities in the second direction, such that forces applied to the optical fiber in directions transverse to the direction of travel of the optical fiber are balanced.

18. The method of claim 14, wherein the at least one plenum comprises a plurality of plenums each supplying one of the plurality of fluid supply cavities and a plurality of regulators in fluid communication with a cooling fluid supply and the plurality of plenums, such that cooling fluid introduced to each of the plurality of plenums is regulated to balance forces and moment loads applied to the optical fiber in directions transverse to the direction of travel of the optical fiber.

19. The method of claim 18 further comprising adjusting a pressure of the cooling fluid introduced to each of the plurality of plenums to maintain a spacing between the optical fiber and the channel.

20. The method of claim 14 further comprising modifying a flow rate of the cooling fluid through the fluid supply cavities in the cooling apparatus to control a temperature of the optical fiber passing through the cooling apparatus.

* * * * *